(12) United States Patent
Josel et al.

(10) Patent No.: US 6,184,379 B1
(45) Date of Patent: Feb. 6, 2001

(54) RHODAMINE DERIVATIVES AND THE USE THEREOF

(75) Inventors: Hans-Peter Josel; Rupert Herrmann, both of Weilheim; Dieter Heindl, Tutzing; Klaus Muhlegger, Polling; Gregor Sagner, Penzberg; Karl Heinz Drexhage, Siegen; Jorg Frantzeskos, Wenden; Jutta Arden-Jacob, Zirndorf, all of (DE)

(73) Assignee: Roche Diagnostics GmbH (DE)

( * ) Notice: Under 35 U.S.C. 154(b), the term of this patent shall be extended for 0 days.

(21) Appl. No.: 09/324,265

(22) Filed: Jun. 2, 1999

(30) Foreign Application Priority Data

Jun. 3, 1998 (DE) .............................. 198 24 535

(51) Int. Cl.⁷ ................................ C07D 491/47

(52) U.S. Cl. .................. 546/48; 435/6; 435/71; 436/546; 436/800

(58) Field of Search .................. 546/48; 435/6, 435/71; 436/546, 800

(56) References Cited

U.S. PATENT DOCUMENTS

| | | | |
|---|---|---|---|
| 5,210,015 | 5/1993 | Gelfand et al. | 435/6 |
| 5,750,409 | * 5/1998 | Herrmann et al. | 436/517 |

FOREIGN PATENT DOCUMENTS

| | | | |
|---|---|---|---|
| 0 285 179 A2 | 10/1988 | (EP) | G01N/33/533 |
| 0 543 333 A1 | 5/1993 | (EP) | C09B/11/24 |
| 0 567 622 B1 | 11/1993 | (EP) | C09B/11/24 |
| 0 805 190 A2 | 11/1997 | (EP) | C09B/69/00 |
| 2 300 119 | 9/1976 | (FR) | C09B/11/28 |
| WO 97/49769 | 12/1997 | (WO) | C09B/11/24 |

OTHER PUBLICATIONS

Addendum Ediited by Agrawal, Sudhir, of "A Technique for Radiolabeling DNA Restriction Endonuclease Fragments to High Specific Activity," Analytical Biochemistry 137:266–167 (1984).

Christodoulou, Chris, "Protocols for Oligonucleotides and Analogs—Synthesis and Properties," Methods in Molecular Biology 20:19–61 (1993).

Hung, Su–Chun, et al., "Optimization of Spectroscopic and Electrophoretic Properties of Energy Transfer Primers," Analytical Biochemistry 252:78–88 (1997).

Livak, et la., "Oligonucleotides with Fluorescent Dyes at Opposite Ends Provide a Quenched Probe System Useful for Detecting PCR Product and Nucleic Acid Hybridization," PCR Methods and Applications 4:357–362 (1995).

March, Jerry, "Advanced Organic Chemistry: Reactions, Mechanisms, and Structure," Second Edition, pp. 383–384.

March, Jerry, "Advanced Organic Chemistry: Reactions, Mechanisms, and Structure," Fourth Edition, pp. 383–386.

(List continued on next page.)

*Primary Examiner*—Bernard Dentz
(74) *Attorney, Agent, or Firm*—Kenneth J. Waite; Roche Diagnostics Corporation

(57) ABSTRACT

The invention concerns rhodamine derivatives of the general formulae

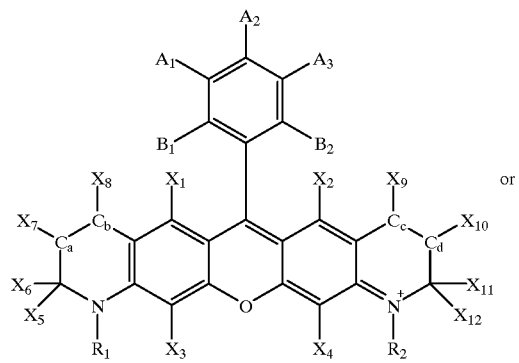

or

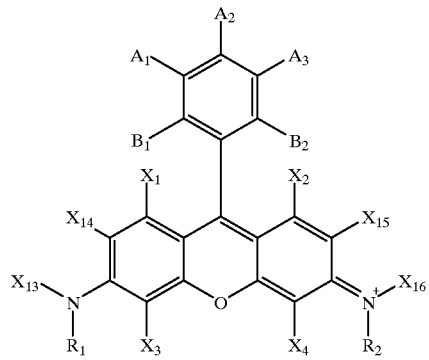

in which Ca–Cd each denote a C atom, and Ca and Cb as well as Cc and Cd are either linked together by a single bond or by a double bond; X1 to X16 denote independently of one another halogen, sulfonic acid, hydrogen or an alkyl residue with 1–20 C atoms in which the alkyl residue can be substituted with one or several halogen or sulfonic acid residues; R1 and R2 are either identical or different and denote either hydrogen, alkyl with 1–20 C atoms, polyoxyhydrocarbyl units, phenyl or phenylalkyl with 1–3 carbon atoms in the alkyl chain in which the alkyl and/or phenyl residues can be substituted by one or several hydroxy, halogen, sulfonic acid, amino, carboxy or alkoxycarbonyl groups where alkoxy can have 1–4 carbon atoms, R1 contains at least one activatable group, R2 and X4 can be optionally linked together via a bridge composed of 0–2 C atoms. In contrast to the prior art, these compounds are characterized in that A1, A2 and A3 can independently of one another denote hydrogen, cyano, halogen and sulfonic acid; B1 denotes either halogen, cyano or hydrogen; B2 denotes hydrogen, amide, halogen and an alkyl residue with 1–20 C atoms. In addition the invention concerns activated rhodamine derivatives, correspondingly conjugated biomolecules and their use in diagnostic systems.

21 Claims, 2 Drawing Sheets

OTHER PUBLICATIONS

Figure 1:
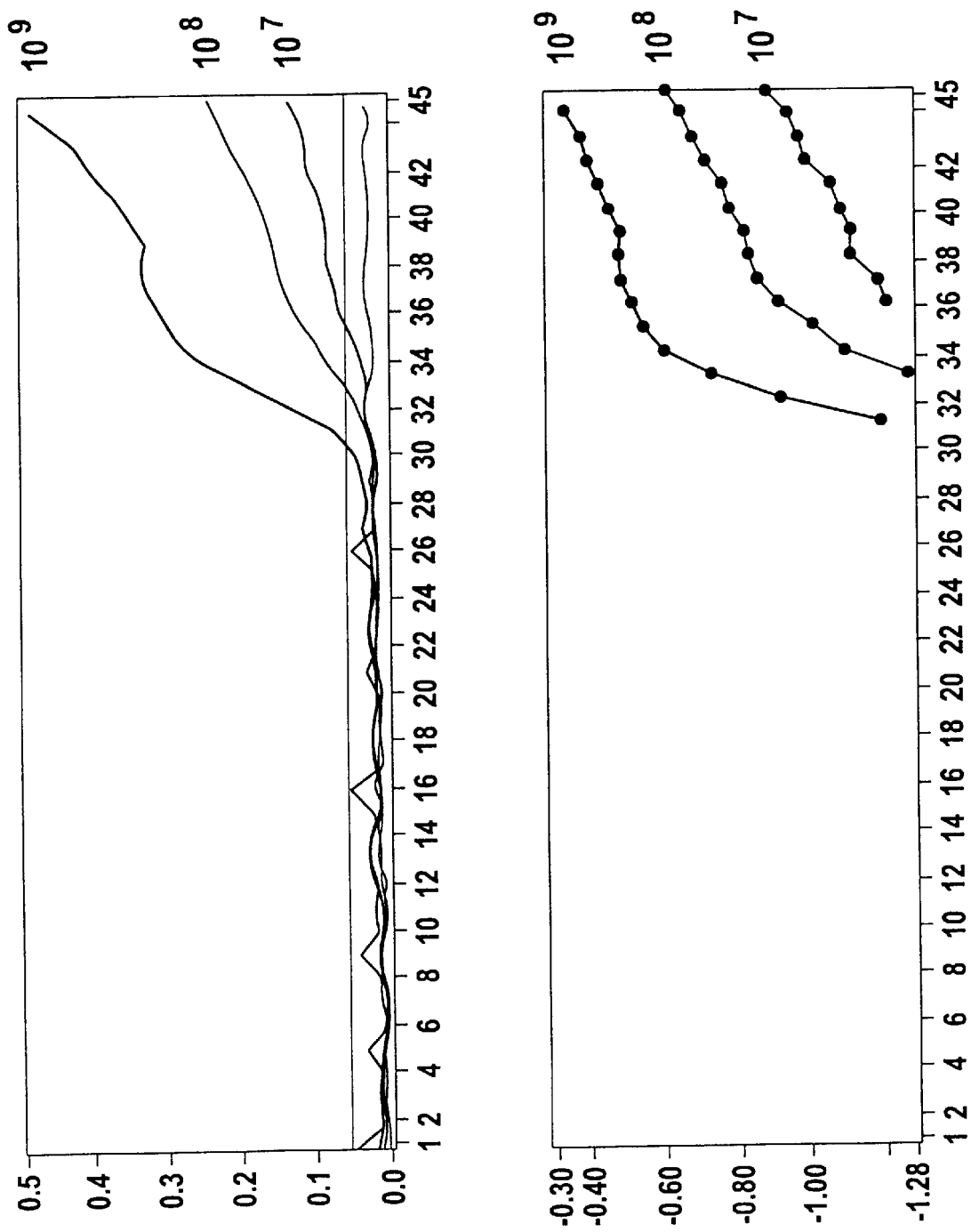

Meyne, et al., "In Situ Hybridization Using Synthetic Oligomers as Probes for Centromere and Telomere Repeats," Methods in Molecular Biology, 33:63–74 (1994).

Rigby, Peter W., "Labeling Deoxyribonucleic Acid to High Specific Activity in Vitro by Nick Translation with DNA Polymerase I," Journal of Molecular Biology 113:237–251 (1977).

Shealy, et al., "Synthesis, Chromatographic Separation, and Characterization of Near–Infrared–Labeled DNA Oligomers for Use in DNA Sequencing," Analytical Chemistry 67:247–251 (1995).

Wittwer, et al., "Continuous Fluorescence Monitoring of Rapid Cycle DNA Amplification," BioTechniques 22:130–138 (1997).

Wittwer, et al., "The LightCycler(TM): A Microvolume Multisample Fluorimeter with Rapid Temperature Control," Bio Techniques 22:176–181 (1977).

* cited by examiner

RHODAMINE DERIVATIVES AND THE USE THEREOF

The claimed invention concerns new pentacyclic rhodamine derivatives whose fluorescence emission maxima are in the range of ca. 520 to 720 nm, biomolecules labelled with these derivatives and their use in diagnostic systems.

Numerous rhodamine derivatives are known which can be used as markers (labelled substances) in the form of hydrophilic derivatives with appropriate reactive groups. Such compounds are for example obtained by reacting NHS esters of tetramethylcarboxyrhodamine or carboxyrhodamine 101 (RHODOS) with proteins containing amino groups, which are used in diagnostic systems. Examples of hapten-fluorescent conjugates are described in EP-A-285179 but the described compounds have absorption maxima at wavelengths of less than 600 nm.

EP 0 543 333 discloses long wavelength rhodamine-like derivatives which have an absorption maximum above 600 nm. However, at the time of the invention a conversion of the described compounds into corresponding phosphoramidites was unknown.

EP 0 567 622 also discloses the preparation of long wavelength rhodamine derivatives with absorption maxima above 600 nm. However, the synthesis of corresponding nucleic acid conjugates and the use of the described compounds as a component of fluorescence resonance energy transfer systems like those that have become established in nucleic acid analysis (Bio Techniques Vol. 22, No.1, p. 130–138, 1997) has not been previously described.

The fluorescent dye fluorescein is widely used because of its spectral properties and its general availability and it is used for a wide variety of applications. In so-called FRET systems fluorescein usually acts as a fluorescence resonance energy donor in which various fluorescence resonance energy acceptors can be potentially used depending on the analytical test procedure. However, the use of FRET systems in nucleic acid analysis has previously been limited to the use of cyanine derivatives such as Cy5 (PCR Methods Appl. 4, 357–362, 1995) and the rhodamine derivatives TAMRA and ROX (Anal.Biochem. 252, 78–88, 1997).

The object of the present invention is therefore to provide new rhodamine derivatives with improved spectral properties in the long wavelength range which are especially suitable for forming a fluorescence resonance electron transfer pair together with other dyes to enable the use of biomolecules labelled with the rhodamine derivatives for analytical or diagnostic purposes.

Hence the invention concerns compounds of the general formulae

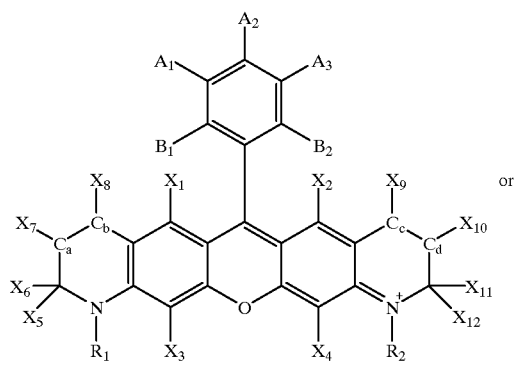

or

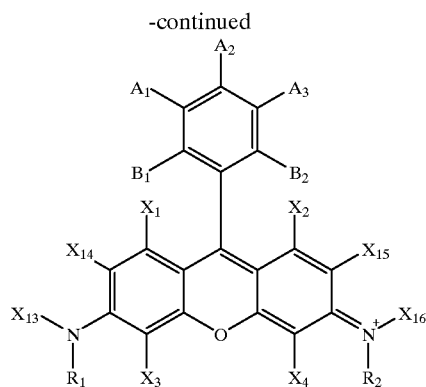

in which Ca–Cd each denote a C atom, and Ca and Cb as well as Cc and Cd can either be linked together by a single bond or by a double bond; X1 to X16 denote independently of one another either halogen, sulfonic acid, hydrogen or an alkyl residue with 1–20 C atoms in which the alkyl residue can be substituted with one or several halogen or sulfonic acid residues. R1 and R2 are either identical or different and denote either hydrogen, alkyl with 1–20 C atoms, polyoxyhydrocarbyl units, phenyl or phenylalkyl with 1–3 carbon atoms in the alkyl chain in which the alkyl and/or phenyl residues can be substituted by one or several hydroxy, halogen, sulfonic acid, amino, carboxy or alkoxycarbonyl groups where alkoxy can have 1–4 carbon atoms. R1 contains at least one activatable group. R2 and X4 can be optionally linked together by a bridge composed of 0–2 C atoms. In contrast to the previously known state of the art, these compounds are characterized in that A1, A2 and A3 can independently of one another denote halogen, cyano, hydrogen, carboxylic acid, phosphoric acid or sulfonic acid; B1 denotes either halogen, cyano or hydrogen; and B2 is selected from a group comprising hydrogen, amide, halogen and an alkyl residue with 1–20 C atoms.

It has turned out to be advantageous when at least one residue of the group A1, A2, A3 and B1 represents a halogen and in particular fluorine or chlorine. Preferably all residues A1, A2, A3 and B1 are halogens and in particular fluorine or chlorine. The preparation of such compounds is relatively simple when all residues A1, A2, A3 and B1 are either only fluorine or only chlorine. Compounds are also preferred in which B2 is identical with a hydrogen atom. However, B2 can alternatively also denote fluorine or chlorine, such compounds being particularly simple to synthesize when all the residues A1, A2, A3, B1 and B2 are either only fluorine or only chlorine.

The residues X1, X2, X3, X4, X7, X10, X14 and X15 are preferably hydrogen. The residues X5, X6, X8, X9, X11, X12, X13 and X16 are preferably methyl residues. Those compounds are particularly preferred in which all residues X1, X2, X2, X4, X7 and X10 represent hydrogen residues and all residues X5, X6, X8, X9, X11 and X12 represent methyl residues.

The residues R1 and R2 can either be identical or different but at least R1 contains an activatable group such as amino, hydroxyl or carboxyl. R1 preferably contains exactly one activatable group. In a particularly preferred embodiment R1 is a hydroxyethyl residue or a carboxypropyl residue.

If R2 is different from R1, R2 is preferably hydrogen or an alkyl with 1 to 20 C atoms. It is then particularly preferably hydrogen or an ethyl residue.

The compounds according to the invention provide molecules which, due to their spectral properties (absorption maxima in the range of ca. 500 nm and above and emission maxima in the range between ca. 520 and 720 nm), are very suitable as dyes and in particular as fluorescent dyes. In this connection the spectral properties of the molecules can be changed by modifying the identity, number and position of the halogen residues with regard to A1, A2, A3 and B1. In this manner it is possible to produce fluorescent dyes with almost any absorption and emission maxima in the range between ca. 520 nm and 720 nm. Hence a subject matter of the invention is also the use of the rhodamine derivatives according to the invention as fluorescent dyes.

In order to prepare conjugates which contain the rhodamine derivatives according to the invention, activated derivatives can be synthesized which are for example suitable for labelling biomolecules or other analytical reagents. The activated derivatives are prepared by utilizing at least one of the activatable groups on the residues R1 and R2 and the activation can be carried out by known standard protocols that are known to a person skilled in the art. Usually the activation is achieved by means of at least one hydroxyl group, amino or carboxyl group of R1 and R2.

Various reactive groups can be introduced depending on the later application. Phosphoramidites and H phosphonates can for example be derived from a hydroxyl group. Hence rhodamine phosphoramidites or H-phosphonates are usually prepared by previously known protocols (Methods in Mol.Biol.Vol 20, "Protocols for Oligonucleotides and Analogs, Synthesis and Properties", S. Agrawal publisher Humana Press Totowa, N.J.).

In contrast, N-hydroxy-succinimide (NHS) esters and maleinimide alkylamides are usually derived from a carboxyl group. NHS esters are preferably prepared by the process described in EP 0 543 333 in which the free carboxylic acid is reacted with NHS in the presence of a condensation reagent such as DCC or MEI. Rhodamine isothiocyanates are preferably prepared by reacting amino groups with thiophosgene (Advanced Organic Chemistry, McGraw Hill, $2^{nd}$ edition, p. 383, 1997).

Hence the invention also concerns activated derivatives of the rhodamines according to the invention. The reactive groups of the activated derivatives are preferably phosphoramidite, N-hydroxy-succinimide (NHS) ester, maleinimide alkylamide, H-phosphonate or isothiocyanate.

The invention additionally concerns conjugates which are obtainable by binding rhodamine compounds according to the invention or their activated derivatives. Consequently such conjugates are composed of at least two components, of which one component represents a rhodamine derivative according to the invention. The conjugates are prepared by standard protocols starting from the activated derivatives. The conjugation methods that are suitable in each case are known to a person skilled in the art.

The conjugates according to the invention can be used for analytical purposes as soon as a second component of the conjugate can bind to a binding partner to be determined and, after excitation with light of a suitable absorption wavelength, the complex that is formed is detected by means of the emitted fluorescence of the formed complex.

The conjugates according to the invention are particularly suitable for analyses for diagnostic purposes or for analyses of medical or biological material. Hence a subject matter of the invention are especially those conjugates which can interact with a biomolecule. These are usually conjugates that usually themselves contain one or several biomolecules as an additional component.

These biomolecules contained in the conjugates can for example be single-stranded or double-stranded nucleic acids such as DNA, RNA, oligonucleotides and oligonucleotide derivatives and modified nucleic acid analogues such as e.g. PNA, but also individual nucleotides, nucleotide derivatives, nucleotide analogues or nucleoside triphosphates. Such molecules are labelled at the 5' position preferably by means of an NHS ester or a phosphoramidite or, in contrast, they are labelled at the 3' position preferably by means of a dye-substituted carrier material such as CPG. Labelling at other sites such as the nucleic acid bases is also preferably carried out by means of an NHS ester.

When labelling proteins, protein complexes, antibodies or amino acids it is preferable to carry out the conjugation via isothiocyanate. Examples of other conjugate components are vitamins, steroid hormones, lipid molecules and haptens. Furthermore it is also possible to correspondingly label more complex biological structures such as membrane fractions or whole cells.

Oligonucleotides that are conjugated with a rhodamine derivative according to the invention represent a special embodiment of the conjugates according to the invention. Oligonucleotides labelled in this manner can be used in previously known methods to detect and analyse nucleic acids such as by in situ hybridization (Meyne and Myzis, Methods Mol.Biol. 33, 63–74, 1994) or also as primers in various sequencing methods (Sheealy et al., Anal.Chem. 67, 247–251, 1995).

In addition to nucleic acid labelling by chemical synthesis, substrates for nucleic acid polymerases labelled with rhodamine dyes according to the invention such as ribonucleoside triphosphates or deoxyribo-nucleoside triphosphates can be incorporated into nucleic acids by various enzymatic reactions. This is achieved for DNA with the aid of DNA polymerases for example using the method of nick translation (Rigby et al., J.Mol.Biol. 113, p. 237, 1977) or by random primed labelling (Feinberg and Vogelstein, Anal.Biochem. 137, p. 266, 1984). In the case of RNA this is achieved for example by T3, T7 or SP6 RNA polymerases in the sense of a transcription. An additional method for labelling nucleic acids is via a so-called "3' tailing reaction" with the aid of terminal transferase.

Hence a subject matter of the invention is also the use of conjugates according to the invention to label nucleic acids by chemical or enzymatic methods and the use of hybridization probes labelled according to the invention for the detection and analysis of nucleic acids.

For an analytical test the rhodamine derivative according to the invention is firstly excited with light of a suitable wavelength using for example lasers, laser diodes or LEDs as a light source. The fluorescence is detected by measuring methods that are known to a person skilled in the art depending on the analyte. Examples are fluorescence microscopy for in situ methods or the detection of the emitted radiation by suitable photodiodes.

As an alternative to the direct excitation of the dye according to the invention with radiation energy of a suitable wavelength, the excitation can also be achieved by a so-called fluorescence resonance energy transfer. In this technique a second fluorescent dye such as fluorescein is excited with light of a suitable wavelength. Subsequently a so-called non-radiative i.e. radiationless energy transfer onto the rhodamine derivative according to the invention occurs due to the spatial proximity of the two dyes (Van der Meer et al., Resonance Energy Transfer, VCH, 1994). Detection of the light emitted from this molecule at a particular wavelength can be preferably used to quantitatively determine the analyte. Hence the invention also concerns the use of a rhodamine derivative according to the invention or of a corresponding conjugate as a component of a fluorescence resonance energy transfer system.

In this method the compounds according to the invention preferably serve as resonance energy acceptors in which case compounds with the following structural formulae have proven to be particularly suitable:

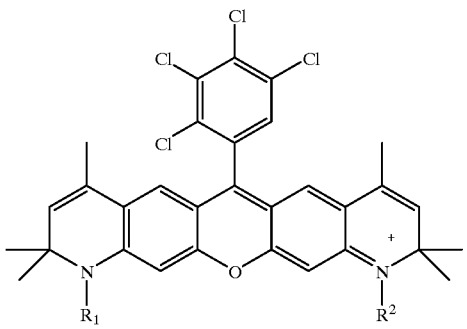
(JA270)

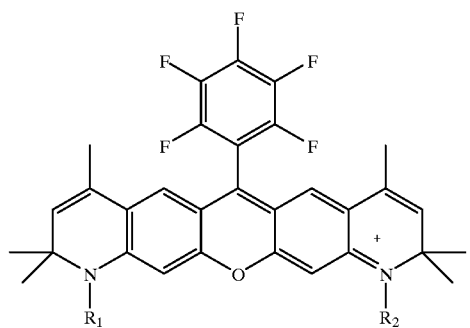
(JF9)

Preferred resonance energy donors for all compounds according to the invention, especially JA 270 and JF9, are fluorescein or fluorescein conjugates. Hence the invention also concerns the use of rhodamine derivatives according to the invention or of corresponding conjugates together with fluorescein or corresponding conjugates as a fluorescence resonance energy acceptor in a fluorescence resonance energy transfer system.

Hybridization probes such as oligonucleotides labelled with fluorescent dyes that can be detected using the principle of fluorescence resonance energy transfer (FRET) are suitable for the quantitative detection of nucleic acids. For example in the case of oligonucleotides the 5' end can be labelled with a dye component of the FRET system and the 3' end can be labelled with the other dye component of the FRET system. In alternative embodiments the oligonucleotides can also be internally labelled.

In a certain embodiment such an oligonucleotide labelled with two dyes is used during a nucleic acid amplification to detect the products that are formed by determining the emission of the fluorescence resonance energy donor. If the oligonucleotide is not bound to the target, no fluorescence of the donor resulting from radiation-free energy transfer is measurable. However, if the oligonucleotide binds to the target DNA, the two dye components are spatially separated from one another as a result of exonuclease activities of the DNA polymerase that is used so that it is possible to measure a fluorescence of the FRET donor (U.S. Pat. No. 5,210,015).

In preferred embodiments the different dyes are located on two different hybridization probes which can hybridize in spatial proximity to the target nucleic acid. These can for example be two oligonucleotide probes which hybridize to the same strand of the target nucleic acid in which case one dye is located on the 3'-terminal nucleotide of the first probe and the other dye is located on the 5'-terminal nucleotide of the second probe so that the distance between the two is only a low number of nucleotides and this number can be between 0 and 30. When using fluorescein in combination with a rhodamine derivative according to the invention such as JA 270 or JF9, distances of 0–15 and in particular of 1–5 nucleotides and in many cases of 1 nucleotide have proven to be advantageous. If the nucleotide distances between the dye components are adhered to, it is also possible to use probes that are not terminally but rather internally conjugated with one of the dyes. In the case of double-stranded target nucleic acids it is also possible to use probes that bind to different strands of the target provided a certain nucleotide spacing of 0 to 30 nucleotides between the two dye components is adhered to.

Hence a further subject matter of the invention is the use of a conjugate according to the invention composed of an oligonucleotide and a rhodamine derivative according to the invention such as JA 270 or JF9 to analyse nucleic acids wherein an additional conjugate composed of a second oligonucleotide and another fluorescent dye, preferably fluorescein, is used and after exciting a dye which is preferably coupled to the second oligonucleotide, a fluorescence resonance energy transfer can take place. Correspondingly labelled oligonucleotide combinations are named FRET pairs in the following.

The use of such FRET pairs has proven to be particularly advantageous for the detection of amplification products during or after a polymerase chain reaction. Hence the invention additionally concerns the use of a conjugate according to the invention as a component of a FRET pair to detect reaction products of a nucleic acid amplification reaction. In a particular embodiment one of the two amplification primers can at the same time be labelled with one of the two dyes that are used and thus contributes one of the two components of the FRET.

The use of suitable FRET pairs to detect the amplification products enables a so-called real time monitoring of PCR reactions in which data on the generation of the amplification product can be determined in relation to the number of reaction cycles that have occurred. This is usually achieved by the fact that the oligonucleotides of the FRET pair also hybridize to the target nucleic acid as a result of the reaction and temperature conditions during the necessary annealing of the amplification primers and when suitably excited, a corresponding measurable fluorescence signal is emitted. Hence the data obtained allow the amount of the originally used target nucleic acid to be determined quantitatively. Hence such embodiments are particularly significant for quantitative RT-PCR experiments in which RNA concentrations of a biological sample are quantified. Hence the invention also concerns the use of conjugates according to the invention as a component of a FRET pair to detect reaction products of a nucleic acid amplification reaction in which the reaction product is detected in each cycle. A further subject matter of the invention is the use of conjugates according to the invention as a component of a FRET pair to carry out a quantitative determination of the nucleic acid to be amplified.

In another embodiment the amplification product is detected after completion of the amplification reaction in which, after hybridization of the FRET pair to the target nucleic acid to be detected, the temperature is in turn continuously increased as part of a melting curve analysis.

At the same time the emitted fluorescence is determined in relation to the temperature. In this manner sequences are detected which hybridize less stringently to the FRET pair due to certain mismatches. The melting points determined in this manner thus serve to detect point mutations or other polymorphisms. Hence the invention also concerns the use of conjugates according to the invention as a component of a FRET pair to determine melting curves especially when identifying polymorphisms and point mutations.

EXAMPLES

Example 1

Synthesis of a Dye JA 270 According to the Invention 1-(2-hydroxyethyl)-6-(2,3,4,5-tetrachlorophenyl)-11-ethyl-2,2,4,8,10,11-hexamethyl-10,11-dihydro-2H-13-oxa-11-aza-1-azonia-pentacene perchlorate 1st Step 2,2,4-trimethyl-7-methoxy-1,2-dihydroquinoline mol. weight: 203.05 g/mol 273 g (2.2 mol) m-anisidine and subsequently 221 g (2.2 mol) mesityl oxide were added dropwise at 15–20° C. to 25 ml glacial acetic acid. Then the solution was stirred for ca. 18 hours at room temperature. Subsequently 500 ml hydrobromic acid was added dropwise at 20–30° C. After stirring for 1 h at room temperature the precipitate was filtered. The precipitate which was still wet, was suspended in ca. 1 l acetone, filtered and dried. 200 g 2,2,4-trimethyl-7-methoxy-1,2-dihydro-quinoline hydrobromide was resuspended in a mixture of 1 l water and 500 ml chloroform. The suspension was then neutralized with 10% sodium hydroxide solution. The organic phase was subsequently washed with water, dried over sodium sulfate and evaporated to dryness in a rotary evaporator. The green coloured oil solidified after a short time. The solid was recrystallized from hexane. Colourless crystals formed in a yield of 39% with a melting point of 67° C.–69° C.

2nd Step

N-(2-hydroxyethyl)-2,2,4-trimethyl-7-methoxy-1,2-dihydroquinoline mol. weight: 247 g/mol 51 g (0.4 mol) N,N-diisopropylethylamine, 72.5 g (0.57 mol) 2-bromoethanol and a spatula tip of potassium iodide were added to 50 g (0.24 mol) 2,2,4-trimethyl-7-methoxy-1,2-dihydroquinoline. The solution was stirred for 24 hours at 110 to 120° C. The organic phase was subsequently washed with dilute sodium hydroxide solution and water and dried over sodium sulfate. The solvent was then completely removed by distillation. A light-green oil was obtained as the product.

3rd Step

Acetic acid-(2-(2,2,4-trimethyl-7-methoxy-1,2-dihydroquinolin-1-yl)-ethyl) ester mol. weight: 289 g/mol 18 g (0.17 mol) acetic anhydride was added to 10 g (0.04 mol) N-(2-hydroxyethyl)-2,2,4-trimethyl-7-methoxy-1,2-dihydroquinoline. 10 drops of concentrated sulphuric acid were added to this and it was heated for 1 h to 100 to 110° C. The reaction mixture was poured onto ice and extracted with chloroform. The combined organic phases were dried over sodium sulfate and distilled. The light-yellow oil that formed had a boiling point of 140° C./$10^{-3}$ mbar.

4th Step

N-ethyl-2,2,4-trimethyl-7-methoxy-1,2-dihydroquinoline mol. weight: 231.2 g/mol 103 g (0.8 mol) N,N-diisopropylethylamine and 231 g (1.5 mol) diethylsulfate were added to 100 g (0.49 mol) 2,2,4-trimethyl-7-methoxy-1,2-dihydroquinoline. The solution was refluxed for 24 h. 100 ml 10% aqueous sodium hydroxide solution and 200 ml chloroform were added to the reaction mixture and it was subsequently cooled to room temperature. Afterwards the organic phase was washed several times with water and dried over sodium sulfate. The solvent was completely removed by distillation. The residue was fractionally distilled. A light-yellow oil with a boiling point of 94–96° C./0.01 Torr was isolated.

5th Step

N-ethyl-7-hydroxy-2,2,4-trimethyl-1,2-dihydroquinoline hydrobromide mol. weight: 298.1 g/ml 60 g (0.25 mol) N-ethyl-2,2,4-trimethyl-7-methoxy-1,2-dihydroquinoline was dissolved in 150 ml glacial acetic acid and 150 ml hydrobromic acid was added. The solution was refluxed for 24 h. The cooled solution was stirred in an ice/methanol bath. Subsequently the precipitate was filtered and washed several times with acetone. Colourless crystals were formed in a yield of 85%.

6th Step

N-ethyl-7-hydroxy-2,2,4-trimethyl-1,2-dihydroquinoline mol. weight: 217.2 g/mol 200 g N-ethyl-7-hydroxy-2,2,4-trimethyl-1,2-dihydroquinoline hydrobromide was suspended in a mixture of 1 l water and 500 ml chloroform. 20% sodium acetate solution was added to this suspension until the pH value reached ca. 5. The organic phase was washed with water, dried over sodium sulfate and evaporated to dryness in a rotary evaporator. A light-brown oil was obtained in this manner. Since the released base decomposes very rapidly, only the required amount of base for the further process was released from the hydrobromide.

7th Step 6-(2-Carboxy-3,4,5,6-tetrachlorobenzoyl)-1,2-dihydro-1-ethyl-7-hydroxy-2,2,4-trimethylquinoline mol. weight: 503.2 g/mol 24 g (0.11 mol) N-ethyl-7-hydroxy-2,2,4-trimethyl-1,2-dihydroquinoline and 31.6 g (0.11 mol) tetrachloro-phthalic acid anhydride were dissolved in 200 ml 1,2-dichloroethane and refluxed for 3 h. After cooling, the solution was filtered and evaporated to dryness in a rotary evaporator. The residue was suspended in ca. 500 ml chloroform and heated to boiling. The solid (=product) was filtered. In order to increase the yield, the mother liquor was rotary evaporated to dryness and purified by column chromatography. For this ca. 100 g silica gel (ICN silica 32–63, 60A) was used as a separation material for ca. 3 g crude product. A mixture of chloroform +5% ethanol serve as a flow agent. The filtered solid was dissolved in ca. 1 l diethyl ether. After filtering the solvent was removed by distillation and the residue was dried to form a yellow solid.

8th Step 1-(2-hydroxyethyl)-6-(2,3,4,5-tetrachlorophenyl)-11-ethyl-2,2,4,10,11-hexamethyl-10,11-dihydro-2H-13-oxa-11-aza-1-azonia-pentacene perchlorate (JA 270)

mol. weight: 756.5 g/mol 8.7 g (0.017 mol) 6-(2-carboxy-3,4,5,6-tetrachloro-benzoyl)-1,2-dihydro-1-ethyl-7-hydroxy-2,2,4-trimethylquinoline and 5 g (0.017 mol) acetic acid-(2-(2,2,4-trimethyl-7-hydroxy-1,2-dihydroquinol-1-yl)-ethyl) ester were refluxed in 500 ml dichloromethane until all components had dissolved. Afterwards 20 g phosphorus pentoxide was added carefully while stirring and heated to boiling for 1 h. Subsequently the solvent was removed in a vacuum and 100 ml 70% sulphuric acid was added to the residue. The solution which slowly coloured red was stirred for 40 min at 120° C. After cooling the reaction mixture was slowly poured into 500 ml ice-cooled ethanol and filtered. 50 ml 60% perchloric acid and 5 l water were added dropwise to the filtered solution. The precipitated dye was filtered and dried over phosphorus pentoxide in a desiccator (yield: 5.6 g). Ca. 2 g of the crude product was dissolved in a mixture of 60 ml acetone and 50 ml 2 N hydrochloric acid and refluxed for 20 h. After cooling the dye was precipitated by the addition of perchloric acid and water and dried. The dye was then prepurified by column chromatography (Alox N/ethanol). Subsequently the dye fraction was filtered, concentrated and again precipitated. Ca. 1 g of the dye was then dissolved in o-dichlorobenzene and refluxed for 5 h. Subsequently the solvent was removed in a water yet vacuum. The residue was distilled a further three times with ca. 50 ml water. Subsequently the residue was taken up in ethanol and filtered. The dye was again precipitated by the addition of perchloric acid and water. The absorption maximum in ethanol was determined to have a wavelength of 615 nm. The compound synthesized in this manner has the following structural formula.

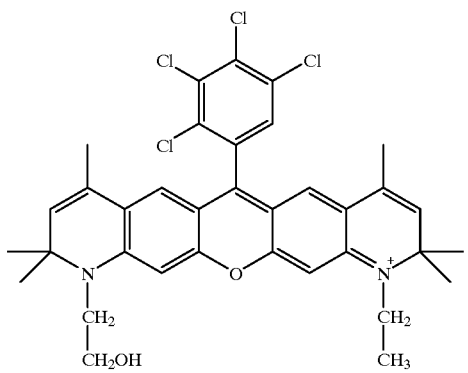

Example 2

Synthesis of a Phosphoramidite According to the Invention 1-(2-(2-Cyano-ethoxy)diisopropylamino-phosphanyloxy)-ethyl)-6-(2,3,4,5-tetrachlorophenyl)-11-ethyl-2,2,4,8,10,11-hexamethyl-10,11-dihydro-2H-13-oxa-11-aza-1-azonia-pentacene perchlorate 985 mg (1.5 mmol) of the rhodamine derivative (2-hydroxyethyl)-6-(2,3,4,5-tetrachlorophenyl)-11-ethyl-2,2,4,8,10,11-hexamethyl-10,11-dihydro-2H-13-oxy-11-aza-1-azonia-pentacene perchlorate prepared in example 1 and 257 mg (1.5 mmol) diisopropylamino tetrazolide were dissolved under argon in 50 ml dry methylene chloride. After addition of 450 mg (1.5 mmol) bis(N,N-diisopropyl-amino)-cyanoethyl-phosphine it was stirred for 1 h at room temperature. The solvent was removed by distillation and the residue was taken up in 150 ml ethyl acetate. The mixture was washed twice with 50 ml 5% sodium hydrogen carbonate solution each time. The organic phase was dried over sodium sulfate, filtered and subsequently the solvent was removed in a vacuum on a rotary evaporator. The residue was taken up in dioxane and precipitated with hexane. The precipitate was filtered, dissolved in acetonitrile and the solution was filtered through a 0.45 µm filter (Millipore SLHV025NS). The filtrate was evaporated to dryness in a vacuum. The residue was lyophilized from 30 ml dioxane. The yield was 1 g of a dark-blue powder.

Example 3

Preparation of a Labelled Oligonucleotide with the Aid of a Phosphoramidite 1-2-(2-Cyano-ethoxy)diisopropylamino-phosphanyloxy)-ethyl)-6-(2,3,4,5-tetrachlorophenyl)-11-ethyl-2,2,4,8,10,11-hexamethyl-10,11-dihydro-2H-13-oxa-11-aza-1-azonia-pentacene perchlorate Oligonucleotides were prepared in an ABI 394 synthesizer under standard conditions of the manufacturer using p-tert.-butyl-phenoxyacetyl protected phosphoramidites (PerSeptive Biosystems cat. No. GEN 084290-084292). The same apparatus was used to couple the dye by using a 0.1 mmol solution of the phosphoramidite according to the invention 1-(2-(2-cyano-ethoxy)diisopropylamino-phosphanyloxy)ethyl-6-(2,3,4,5-tetrachlorophenyl)-11-ethyl-2,2,4,8,10,11-hexamethyl-10,11-dihydro-2H-13-oxa-11-aza-1-azonia-pentacene perchlorate in acetonitrile instead of the last base at the 5' end of the synthesized oligonucleotide. After oxidation under standard conditions and a 2 h cleavage of the oligonucleotide with 25% ammonia at room temperature, an oligonucleotide was obtained which was subsequently purified by HPLC (POROS OligoR3 column PerSeptive, Inc., Framingham, Mass., 4.6×50 mm). The labelled oligonucleotide was eluted at a flow rate of 4 ml/min as follows:

eluant A: triethylammonium acetate, 100 mmol/l; pH 6.9 eluant B: triethylammonium acetate, 100 mmol/l; pH 6.9/acetonitrile (1:1).

gradient elution 2 min 100% A 10 min from 100% eluant A to 100% eluant B.

It was eluted isocratically by halting the gradient for ca. 2–3 min at ca. 20–25% B (elution of the unlabelled oligo) and at ca. 55–65% (elution of the labelled oligo). The elution profile was detected optically at 260 nm.

Example 4

Synthesis of an NHS Ester According to the Invention 1-(3-Carboxypropyl)-6-(2,3,4,5-tetrachlorophenyl)-11-ethyl-2,2,4,8,10,11-hexamethyl-10,11-dihydro-2H-13-oxa-11-aza-1-azonia-pentacene-O-succinimide ester perchlorate The tetrachloro-carboxyphenyl precursor was synthesized in analogy to the synthesis sequence described in EP-0543 333. The decarboxylation was carried out as described in example 1 by 5 h reflux boiling in o-dichlorobenzene. The active ester was prepared analogously to the general synthetic procedure in EP 0543 333 in the presence of dicyclohexylcarbodiimide and N-hydroxy-succinimide.

JA 270-NHS-Ester

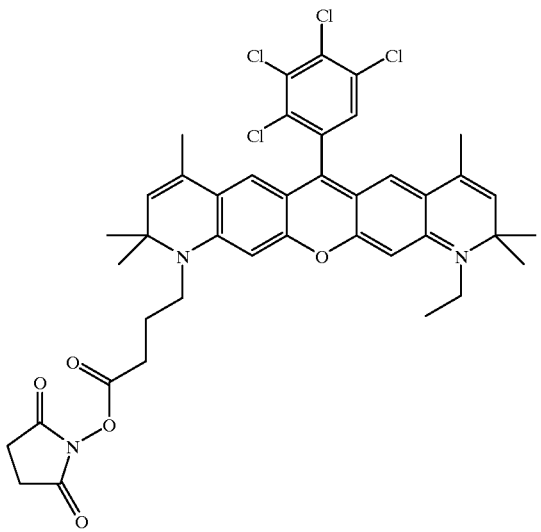

Example 5

Preparation of a 5'-Labelled Oligonucleotide with the Aid of an NHS Ester

Labelling of oligonucleotides with the NHS ester according to the invention 1-(3-carboxypropyl)-6-(2,3,4,5-tetrachlorophenyl)-11-ethyl-2,2,4,8,10,11-hexamethyl-10,11-dihydro-2H-13-oxa-1-aza-1-azonia-pentacene-O-succinimide ester perchlorate Firstly an oligonucleotide substituted at the 5' end with a terminal amino group was prepared for the labelling reaction. The 5' terminal amino function was introduced in the usual manner by reacting the oligonucleotide with an aminolinker phosphoramidite and namely either with "Aminolink 2" (Applied Biosystems, Foster City, Calif.) or with "5'-Amino-Modifier C6-TFA" (GLEN RESEARCH, Sterling, Va., cat. No. 10-1916-02). Amino-modified oligonucleotide (ca. 10-15 A260 units, corresponding to ca. 50–80 nmol) precipitated by ethanol precipitation was dissolved in 200 µl sodium borate buffer, 0.1 mol/l, pH 8.5. After addition of 200 µl of a 1.6 mmolar solution of the NHS ester 1-(3-carboxypropyl)-6-(2,3,4,5-tetrachlorophenyl)-11-ethyl-2,2,4,8,10,11-hexamethyl-10,11-dihydro-2H-13-oxa-11-aza-1-azonia-pentacene-O-succinimide ester perchlorate in DMF solution, the mixture was allowed to stand for 15 h at room temperature while protected from light. Subsequently the mixture was evaporated in a "SpeedVac" (heating 50° C.). The residue was dissolved in 1 ml redistilled water, applied to a "POROS OligoR3" column (PerSeptive, Inc., Framingham, Mass.), 4.6×50 and eluted as follows at a flow rate of 4 ml/min:

buffer A: triethylammonium acetate, 100 mmol/l; pH 6.9 buffer B: triethylammonium acetate, 100 mmol/l; pH 6.9/acetonitrile (1:1)

gradient elution 2 min 100% eluant A (elution N-hydroxy-succinimide)

10 min from 100% eluant A to 100% eluant B.

At ca. 20–25% B (elution of the unlabelled oligo)

at ca- 55–65% (elution of the labelled oligo) it was eluted isocratically by halting the gradient for ca. 2–3 min the free dye elutes at ca. 85%

The elution profile was detected optically at 260 nm.

Example 6

Quantitative RT-PCR by On-line Detection During the Amplification

An oligonucleotide labelled at the 5' end with the aid of a phosphoramidite according to the invention by the method described in example 3 was used as part of a FRET pair for the quantitative detection of an amplified nucleic acid. For this in vitro-transcribed RNA of the TNF-alpha gene (Shirai et al., Nature 313, 803–806, 1985) was titrated as a template ($10^9$–$10^7$ copies/mixture) and amplified by a one step RT-PCR. The RT-PCR mixture contained two differently-labelled hybridization probes for on-line detection during the individual PCR steps. The probe located downstream was 5'-JA270-labelled according to the invention and the upstream probe was 3' labelled with fluorescein. Both probes hybridized to the sequence of the amplicon and were separated only by a few bases so that a fluorescence resonance energy transfer (FRET) could take place between the two labels in the hybridized state.

Each of the three reaction mixtures contained: 2.5 U Tth DNA polymerase, 1×RT-PCR buffer (Tth DNA polymerase kit), 4 mM $Mn^{2+}$, 300 µM dATP, 300 µM dCTP, 300 µM dGTP and 900 µM dUTP, 500 ng BSA, 1 µl in vitro-transcribed RNA ($10^9$, $10^8$ and $10^7$ copies), 1 µM forward primer (17mer, nucleotide position 2588–2602), 1 µM reverse primer (17mer, nucleotide position 2956–2973), 0.4 µM TNF-alpha(wt) specific 3'-fluorescein-labelled hybridization probe (25mer, nucleotide position 2638–2662) and 0.4 µM TNF-alpha(wt)-specific hybridization probe 5'-labelled according to the invention with JA270-phosphoramidite (25mer, nucleotide position 2666–2690).

The reaction mixtures were pipetted into capillaries for the amplification and subjected to the following thermocycles in a suitable Light-Cycler (Wittwer et al., Bio-Techniques 12, 176–181, 1997) for on-line fluorescence detection during an amplification reaction: The template RNA was reversely transcribed within 10 min at 55° C. (temperature ramp 20° C./s, no measurement). Afterwards the cDNA was denatured for 30 sec at 95° C. (temperature ramp 20° C./s, no measurement). Then the cDNA was amplified for 45 cycles with the aid of a polymerase chain reaction (PCR). In the first step of the PCR the template was denatured for 1 sec at 99° C. (temperature ramp 20° C./s, no measurement). In the second step of the PCR the specific forward and reverse primers as well as the two TNF-alpha (wt)-specific hybridization probes hybridized to the template within 15 sec. at 50° C. so that a FRET effect was detectable. The resulting fluorescence was measured at the end of the annealing time in each capillary according to the manufacturer's instructions (temperature ramp 20° C./s, single measurement). In the third step the polymerization was carried out within 18 sec at 72° C. (temperature ramp 20° C./s, no measurement). After 45 cycles of the PCR reaction, the capillaries were cooled for 45 sec. to 40° C.

The evaluation shown in FIG. 1 was carried out using a quantification program of the LightCycler according to the manufacturer's instructions. In the experiment shown it was possible to detect $10^9$–$10^7$ copies of in vitro-transcribed RNA and titrate them according to amount wherein $10^9$ copies were detected for the first time after 31 cycles, $10^8$ copies were detected for the first time after 33 cycles and $10^7$ copies were detected for the first time after 36 cycles.

Example 7

Mutation Analysis By Determining Melting Curves with the Aid of FRET Pairs

An oligonucleotide labelled at the 5' end by the method described in example 3 was used as part of a FRET pair for the detection of the point mutation G to A at nucleotide position 1691 in exon 10 of the human factor V gene (Bertina et al., Nature 369, p. 64, 1994). For this a specific genomic factor V fragment was amplified with the aid of a PCR amplification reaction in a LightCycler (Nittwer et al., BioTechniques 12, 176–181, 1997). The PCR mixture (20 μl) contained 50 mM Tris, pH 8.3, 3 mM $MgCl_2$, 250 μg/ml BSA, 200 μM dATP, 200 μM dGTP, 200 μM dCTP, 600 μM dUTP, 0.2 μM forward primer (nucleotide position 1626–1647 from exon 10), 0.2 μM reverse primer (nucleotide position 127–146 from intron 10), 0.1 μM 3'-fluorescein-labelled hybridization probe (nucleotide position 1684–1701 from exon 10+1–5 from intron 10), 0.5 μM hybridization probe 5' labelled according to the invention with JA270 (nucleotide position 1647–1682, exon 10) and 1.6 U Taq polymerase. In addition either 1 ng factor V wild-type plasmid DNA, 1 ng heterozygote plasmid DNA or 1 ng homozygote mutant plasmid DNA was present in the three mixtures. The 3' labelled probe hybridizing to the mutation site was completely complementary to the wild-type DNA sequence.

The second 5' labelled probe according to the invention hybridizes upstream of the 3' labelled probe so that both labels were only separated by one base and a resonance energy transfer could take place. During the melting curve that was carried out after the amplification reaction the shorter 3' labelled probe melted at first so that a resonance energy transfer was no longer possible. Denaturation, amplification and subsequent melting curve were carried out in the LightCycler under the following conditions:

| Time | Temperature | Temperature ramp | Measurement |
|---|---|---|---|
| 1st. Denaturation (1st cycle) | | | |
| 30 sec | 95° C. | 20° C./sec | none |
| 2nd. Amplification (50 cycles) | | | |
| 0 sec | 95° C. | 20° C./sec | none |
| 10 sec | 50° C. | 20° C./sec | single meas. |
| 10 sec | 72° C. | 5° C./sec | none |
| 3rd. Melting curve (1st cycle) | | | |
| 0 sec | 95° C. | 20° C./sec | none |
| 10 sec | 45° C. | 20° C./sec | none |
| 0 sec | 85° C. | 0.2° C./sec | continuous meas. |

Figure 2:
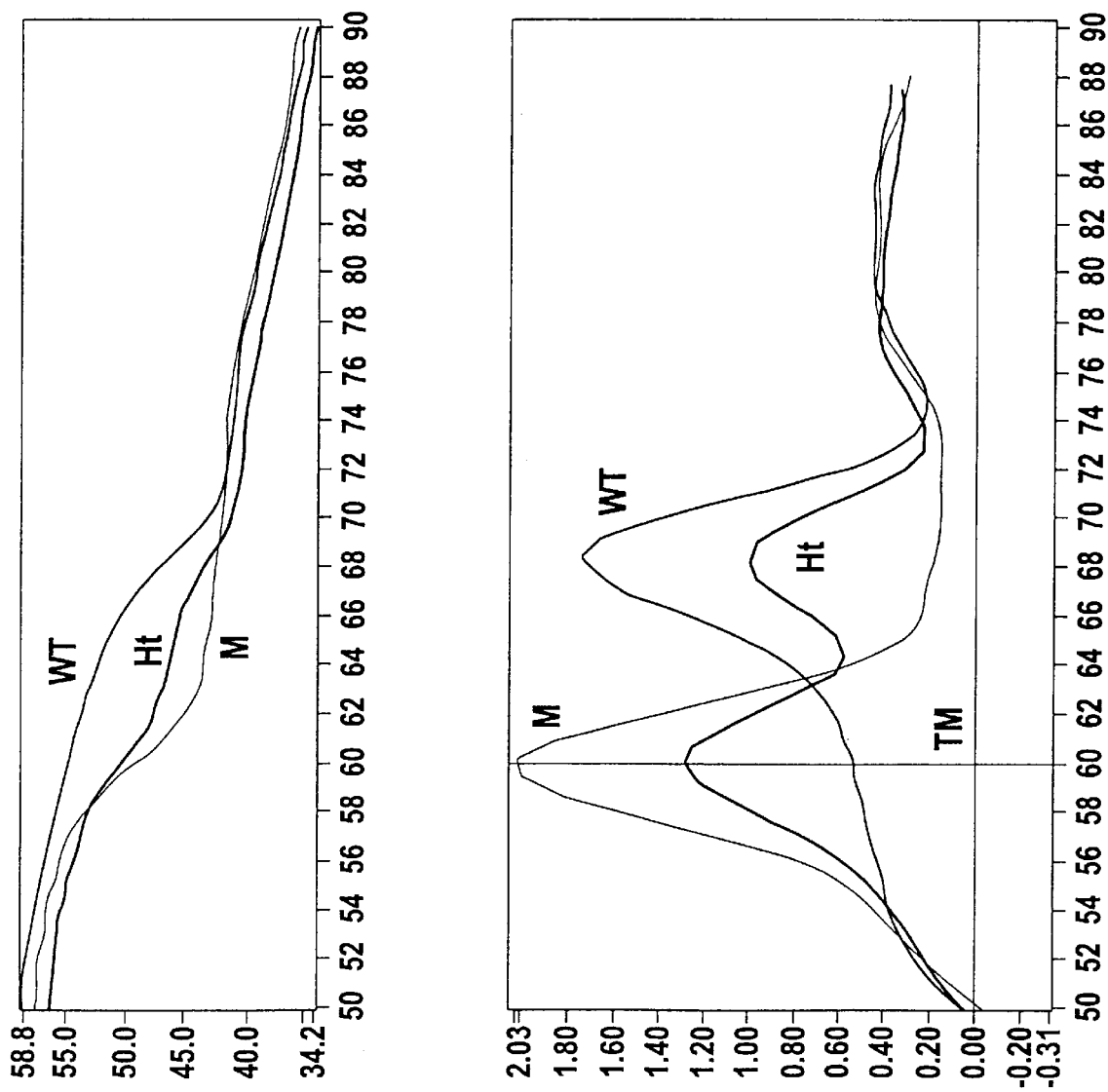

As shown in FIG. 2 it was possible to determine at which temperatures the hybridization probe directed against the locus of the point mutation melted using the measured melting curve and the resulting negative first derivative of the fluorescence intensity versus the melting temperature. In the case of the factor V wild-type plasmid DNA the melting point was 68° C., it was 60° C. for homozygous mutant factor V plasmid DNA and 60° C. and 68° C. for heterozygous factor V plasmid DNA.

Short Description of the Figures

FIG. 1 shows the result of the experiment described in example 6 for the quantification of mRNA by detection of an amplification product using a FRET pair in which one component of the FRET pair was an oligonucleotide labelled according to the invention. The curves graphically represent the measured fluorescence in relation to the number of cycles carried out. $10^9$ copies can be detected for the first time after 31 cycles, $10^8$ copies for the first time after 33 cycles and $10^7$ copies for the first time after 36 cycles.

FIG. 2 shows the result of the experiment described in example 7 for the mutation analysis of the factor V gene with the aid of a melting curve determination in which one component of the FRET pair was an oligonucleotide labelled according to the invention. The curves are a graphic representation of the measured fluorescence or of their negative 1st derivative in relation to the melting temperature ONT: wild-type, M: homozygous DNA; Ht: heterozygous DNA). 5, wherein said reactive group is further bound to a molecule selected from the group consisting of carbohydrates, proteins, antibodies, nucleic acids, nucleic acid analogues, nucleotides, nucleotide analogues, haptens, hormones and vitamins

What is claimed is:

1. A compound of the general formula

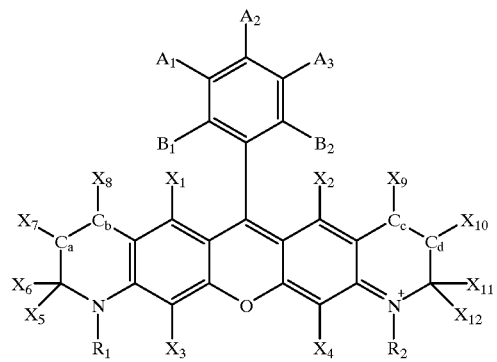

in which

Ca, Cb, Cc and Cd each denote a C atom, Ca and Cb are either linked together by a single bond or by a double bond, and Cc and Cd are either linked together by a single bond or by a double bond;

X1 to X12 are independently selected from a group consisting of halogen, sulfonic acid, hydrogen and an alkyl residue with 1–20 C atoms in which the alkyl residue is optionally substituted with at least one halogen or sulfonic acid residues;

R1 and R2 are either identical or different and are selected from a group consisting of hydrogen, alkyl with 1–20 C atoms, polyoxyhydrocarbyl units, phenyl, and phenylalkyl with 1–3 carbon atoms in the alkyl chain; wherein the alkyl and/or phenyl residues are optionally substituted by at least one hydroxy, halogen, sulfonic acid, amino, carboxy or alkoxycarbonyl groups, and where the alkoxy optionally has 1–4 carbon atoms;

at least R1 contains an activatable group;

R2 and X4 are optionally linked together by 0–2 C atoms, wherein A1, A2 and A3 are independently of one another selected from a group consisting of hydrogen, cyano, halogen and sulfonic acid; B1 is halogen, cyano or hydrogen;

B2 is selected from a group consisting of hydrogen, amide, halogen, and an alkyl residue having 1–20 C atoms.

2. The compound as claimed in claim 1, wherein A1, A2, A3, B1 and B2 are each either fluorine or chlorine.

3. The compound as claimed in claim 1, wherein A1, A2, A3 and B1 are each either fluorine or chlorine; and B2 is hydrogen.

4. The compound as claimed in claim 1, wherein X1, X2, X3, X4, X7 and X10 are hydrogen and/or X5, X6, X8, X9, X11 and X12 are methyl.

5. A compound as claimed in claim 1, wherein R1 or R2 is further bound to a reactive group selected from the group consisting of phosphoramidite, N-hydroxysuccinimide, maleinimide, H-phosphonate and isothiocyanate.

6. The compound as claimed in claim 1, wherein R1 or R2 is further bound to at least one molecule selected from the group consisting of carbohydrates, proteins, antibodies, nucleic acids, nucleic acid analogues, nucleotides, nucleotide analogues, haptens, hormones and vitamins.

7. The compound as claimed in claim 6, in which the at least one molecule is an oligonucleotide or a nucleoside triphosphate.

8. A compound as claimed in claim 5, wherein said reactive group is further bound to a molecule selected from the group consisting of carbohydrates, proteins, antibodies, nucleic acids, nucleic acid analogues, nucleotides, nucleotide analogues, haptens, hormones and vitamins.

9. A fluorescent dye, comprising the compound as claimed in claim 1.

10. A fluorescent dye, comprising the compound as claimed in claim 5.

11. A fluorescence resonance energy transfer system, comprising the compound as claimed in claim 1, and another dye or dye conjugate.

12. A fluorescence resonance energy transfer system, comprising the compound as claimed in claim 5, and another dye or dye conjugate.

13. A fluorescence resonance energy transfer system, comprising the compound as claimed in claim 6, and another dye or dye conjugate.

14. An analytical or diagnostic system, comprising the compound as claimed in claim 1.

15. An analytical or diagnostic system, comprising the compound as claimed in claim 5.

16. An analytical or diagnostic system, comprising the compound as claimed in claim 6.

17. A method of labelling and/or detecting a nucleic acid, comprising contacting a sample with the compound as claimed in claim 7.

18. The method as claimed in claim 17, wherein at least one second conjugate composed of another fluorescent dye and a second oligonucleotide is contacted with the sample and a fluorescence resonance energy transfer can take place after excitation of a dye.

19. The method as claimed in claim 17, further comprising detecting a product of an amplification reaction as the nucleic acid.

20. The method as claimed in claim 19, wherein the product is detected during or after each amplification cycle.

21. The method as claimed in claim 19, wherein a melting curve analysis is carried out.

* * * * *